April 18, 1939.  B. JABLONSKY  2,155,375
PRESSED ARTICLE, PARTICULARLY AIRSCREW BLADE, OF
LAMINATED WOOD, AND METHOD OF MANUFACTURE
Filed June 14, 1937   2 Sheets-Sheet 1
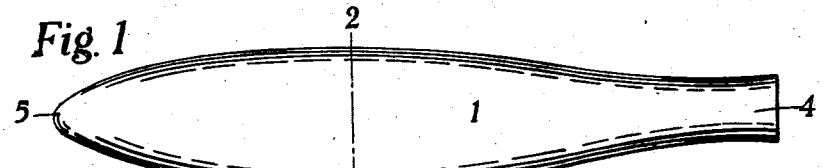
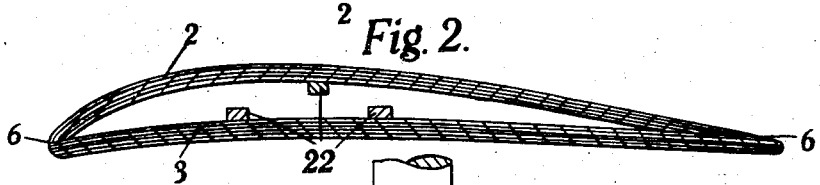
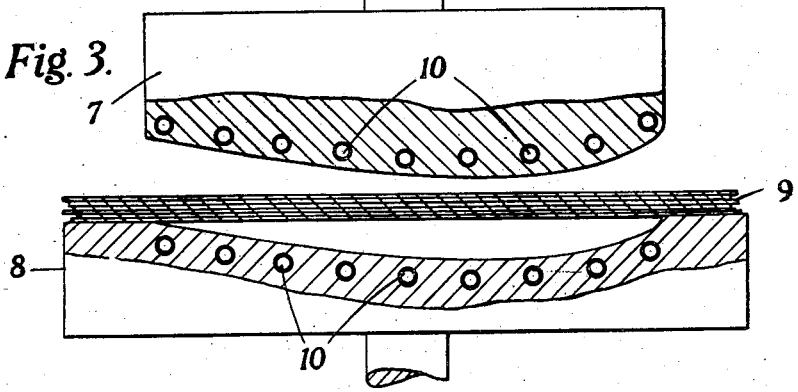
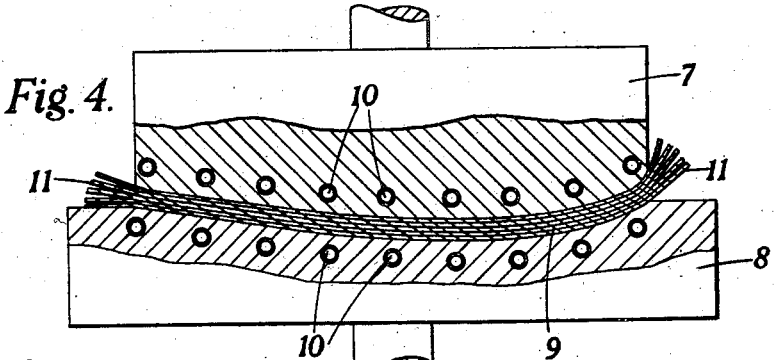
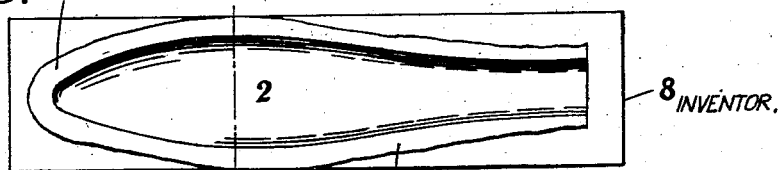
INVENTOR.
Bruno Jablonsky
By Stone, Boyden & Cook
ATTORNEYS.

April 18, 1939.　　　　B. JABLONSKY　　　　2,155,375
PRESSED ARTICLE, PARTICULARLY AIRSCREW BLADE, OF
LAMINATED WOOD, AND METHOD OF MANUFACTURE
Filed June 14, 1937　　　2 Sheets-Sheet 2
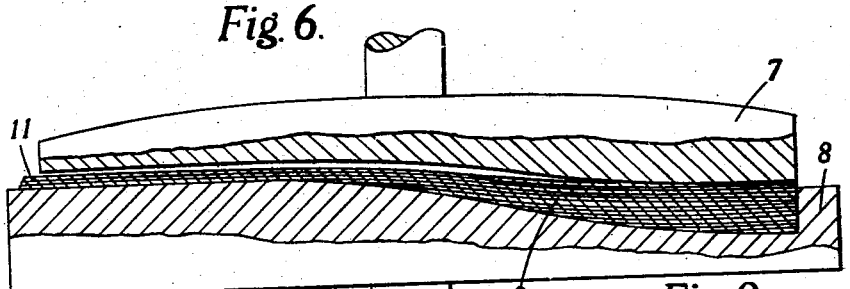
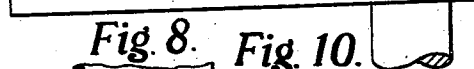
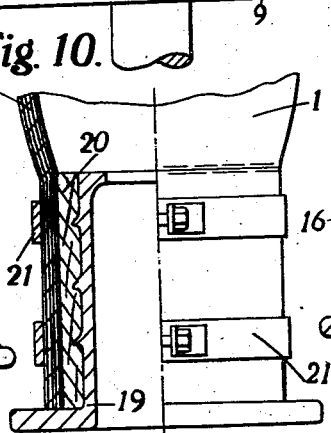
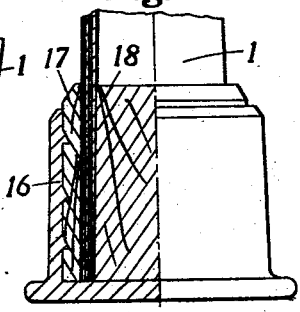
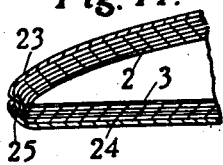
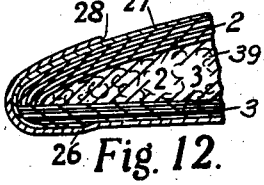
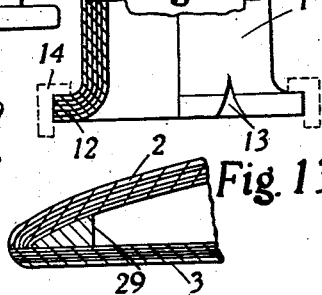
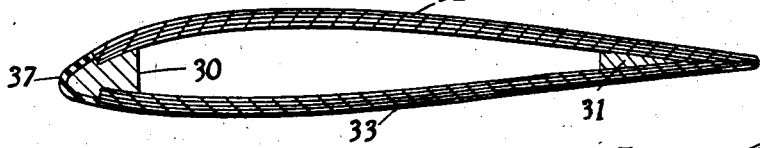
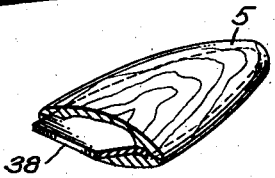
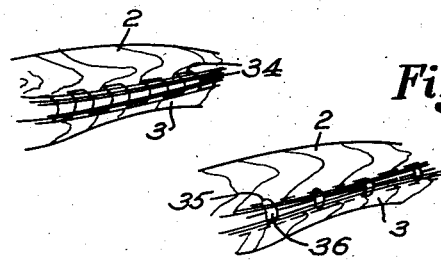
INVENTOR.
Bruno Jablonsky.
By Stone, Boyden & Mash
ATTORNEYS.

Patented Apr. 18, 1939

2,155,375

UNITED STATES PATENT OFFICE 2,155,375

PRESSED ARTICLE, PARTICULARLY AIR-
SCREW BLADE, OF LAMINATED WOOD,
AND METHOD OF MANUFACTURE

Bruno Jablonsky, London, England

Application June 14, 1937, Serial No. 148,185
In Great Britain March 31, 1937

28 Claims. (Cl. 170—159)

This invention relates primarily to wooden airscrews and airscrew blades, although it is applicable also to other wooden articles.

The methods of manufacturing wooden airscrews and airscrew blades have not, in principle, undergone any change or noteworthy improvement for more than twenty-five years. The various methods proposed and in use are based on the principle of building-up a wooden block by arranging several boards, depending in number upon the pitch to be given to the finished screw and covering the length of the screw to be made, one on top of the other, fan-wise, and gluing the boards together, the screw being shaped out of the rough block so formed. In shaping the rough block into an airscrew of fine and exactly determined aerodynamic sections, a considerable amount of superfluous wood has to be cut away and the operation of shaping is tedious, requires great care and is correspondingly expensive, since although shaping to coarse accuracy can be obtained by means of expensive machinery, the final accurate aerodynamic shaping has to be performed manually. This involves repeated measurements and balancing of the blade against another blade in order to secure fine accuracy and uniformity and the work involved for each blade is comparable with that involved in making a pattern or die for casting, pressing or stamping. Furthermore, as the personal factor enters into the manufacture of the blade it is extremely difficult and tedious and, in fact, practically impossible to secure absolute uniformity between a number of blades, despite the skill of the worker.

An object of this invention is to avoid this manual work with its attendant disadvantages by providing a method which enables wooden airscrew blades to be manufactured by mass production methods in a simple and cheap manner and with absolute uniformity and high precision.

Another object is to provide wooden airscrews which are much lighter in weight than those heretofore, without sacrificing rigidity and strength.

A further object is to adapt to the manufacture of hollow wooden articles the technique of pressing as at present extensively practiced for the manufacture of metal articles such as automobile bodies, steel cabinets, etc.

In practising my invention, I employ veneers or thin laminae of wood or wood interleaved with other suitable pliable material, such as fabric or metal gauze. Wood substitutes (artificial wood) may be employed. All such materials are embraced in this specification and appended claims by the expression "wood laminae".

The airscrew blade or other article to be manufactured is formed by gluing and pressing together wood laminae between pressing tools or dies, to form a laminated wooden article of the exact shape and form required. The ultimate exterior form and shape required is obtained during the pressing operation without further work to the surface.

A feature of the invention consists in forming the airscrew blade or other article as a hollow body or shell from a plurality of parts or shells each formed separately by pressing between appropriately shaped dies and subsequently united.

For a clearer understanding of the invention, it will be described in fuller detail in the following in reference to its application to the manufacture of airscrew blades, the accompanying drawings illustrating the method and also some features appertaining to the construction of the blades. In the drawings, Fig. 1 illustrates an airscrew blade in elevation;

Fig. 2 is a section on the line 2—2 of Fig. 1 illustrating the laminar shell construction of the blade;

Figs. 3 and 4 are views partly in sections of Fig. 5 taken transversely through the pressing dies and wood laminae and illustrate the positions of the parts before and after pressing respectively;

Fig. 5 is a plan showing the press-formed shell in the lower die or matrix, the upper die having been removed;

Fig. 6 is a view partly in section taken longitudinally through the dies and laminae, illustrating a modification;

Figs. 7, 8, 9 and 10 illustrate in part section some methods of treatment of the blade root for mounting the blade;

Figs. 11 and 12 are fragmentary transverse blade-sections illustrating additional details;

Figs. 13 and 14 are transverse blade-sections illustrating methods of joining and reinforcing the edges of the blade;

Figs. 15 and 16 are fragmentary views illustrating preferred details appertaining to the uniting of the component shells of the blade; and Fig. 17 is a fragmentary perspective view illustrating a detail.

Fig. 1 diagrammatically illustrates a wooden airscrew blade 1 of conventional shape. In accordance with my improvement, the blade comprises two shells 2, 3 of wood laminae united together, each forming a side or half of the blade extending the length of the blade from the root 4 to the tip 5. The joining line 6 runs longitudinally of the blade from the leading edge to the trailing edge thereof.

The two shells 2, 3 are formed separately by pressing the laminae between dies and since, in the case of an airscrew blade, the shells are not identical, separate operations with separate sets of pressing tools are required. The method of fabricating each shell is the same and therefore it will be sufficient here to deal in detail only with one of the shells, for example, the shell 2.

The pressing dies 7, 8 are appropriately made to give the exact aerodynamic external shaping of the shell 2. Fine wooden veneers 9, preferably of less than 1 mm. thickness, are placed between the pressing tools 7, 8 in such a manner that the fibres of the material of the majority of the laminae run longitudinally of the blade to be formed, that is, from the tip to the root. The laminae 9 are treated on each side with a glue, preferably of the type consisting of a moisture-free synthetic resin material in the form of a film which becomes adhesive under heat at a high temperature of about 130° C. Films of this material are interleaved between the veneers 9. The dies 7, 8 are of steel and are heated in a known manner by a hot fluid, such as water or steam supplied through the channels 10 in the dies, or by electricity. High pressure of the order of 50 to 100 atmospheres or thereabouts according to the particular composition of the resinous films used is applied to the dies 7, 8 by a press, with simultaneous heating of the dies, in order to compress and mould the laminae with the simultaneous application of the adhesive, to form a homogeneous shaped structure. Obviously if the glue employed is of a type which becomes adhesive in the pressing operation in the cold, heat need not be applied.

The number of laminae employed depends upon the stresses which the blade or screw has to withstand and the thickness of the veneers upon the degree of bending and the required pliability. The greater the bending, the thinner the veneers.

As time is required for the adhesive uniting the laminae to set, particularly where they are hot-pressed which involves slow cooling, it is desirable, for rapid production, to provide several sets of pressing tools to a press. In this case, the pressing tools are provided with clamps or the like so that they can be kept in the pressed-down position after being taken out of the press to make room for another set.

Fig. 3 is a view, taken as a transverse section through the dies and laminae, showing the laminae 9 placed in position on the lower die 8, constituting the bed or matrix, prior to pressing. Fig. 4 is a similar view showing the laminae pressed to shape. Fig. 5 is a plan showing the formed laminar shell 2, the upper die 7 having been removed.

To facilitate manufacture, the laminae are initially larger than eventually required and the overlapping marginal portions 11 are subsequently trimmed-off to the correct shape outlined by the pressing tools. However, in the embodiment under discussion, the laminae are initially arranged on the die 8 such that there is no marginal portion 11 longitudinally at the root end of the shell. This is seen from Fig. 5 and more clearly in Fig. 6.

The faces where the two shells 2, 3 are to be joined together are shaved and prepared with a suitable adhesive, after which they are joined together. Preferably, an adhesive is used which will enable the halves to be joined in the cold and under normal pressure, that is, merely with hand clamps or the like. For joining the two halves, a water-resisting adhesive should preferably be used. A type of adhesive which meets these requirements is that consisting of a liquid moisture-free synthetic resin material which is applied to one of the halves, a moisture-free hardener being applied to the other half so that when the two halves are put together, chemical action occurs between the materials applied to the two halves causing a firm union thereof.

By means of the invention, the tedious and expensive manual work which was hitherto necessary for making each airscrew blade is now involved only once in making the pressing tools, and once the tools are made the blades can be mass produced at low cost and greater speed, with absolute uniformity, interchangeability and precision.

The airscrew blade formed in the manner described is hollow since the two halves form a shell. This has the great advantage of eliminating unnecessary weight. Blades have previously been made by pressing together layers or fabrics soaked in Bakelite and other synthetic resinous compositions, but such blades are in one solid piece. Consequently, a considerable amount of material in the middle of the blade is merely dead weight and the high percentage of heavy resin makes the blades practically unusable. The present invention avoids this great disadvantage.

The invention also enables the thickness or density of the shell forming the blade to be graduated from the greatest thickness or density at and near the root where the greatest stresses arise, the thickness gradually tapering or the density gradually diminishing towards the tip where much smaller forces act. This allows further weight to be saved, which, so far, has been impossible with other methods. This is achieved by employing pressing tools 7, 8 the working faces of which are tapered longitudinally as illustrated in longitudinal section in Fig. 6 and to the laminae 9 running from root to tip. Shorter laminae, reduced in length, step-like, as illustrated, to correspond with the tapering of the tools, are added on the inner side of the shell as illustrated, or on the outer side.

The root of the blade must be provided with suitable means for fixing the blade to a hub. One method and arrangement for this purpose is illustrated in Fig. 7. In this figure, the root of the blade 1 is provided with a flange 12 formed by gluing and bending to shape under pressure the root ends of the wood laminae of the shells 2 and 3. The flange 12 is thus integral with the blade shell, the fibres of the laminae running without interruption from the tip of the blade to the end of the flange. The flange part on each of the shells 2, 3 is preferably formed simultaneously during the formation of the shell by employing laminae of sufficient length to provide for the flange and suitably modifying the pressing tools. Alternatively, the flange may be pressed-out from the blade shell in a separate operation subsequently. The formation of the flange necessitates slitting the ends of the shell laminae, e. g. by sawcuts, to allow for the increased diameter on bending these ends to form the flange. On the bending, the sawcuts open out as indicated at 13. The flange 12 is held in a clamping ring 14 in known manner by which the blade is mounted.

If, for bigger engines, the method described with reference to Fig. 7 is not adequately safe, a flanged metal collar or sleeve is fitted to the root end of the blade and the root is reinforced for ensuring a reliable fixing. Some constructions are illustrated, by way of example, in Figs. 8, 9 and 10, although numerous variations will be apparent to those skilled in the art.

In Fig. 8, the root of the blade 1 (which is shown of tapering thickness as described with reference to Fig. 6) is reinforced by a tightly-fitting metal sleeve 15. The flanged metal collar 16, by which the blade is secured to a hub, is screwed onto the blade root. In order not to destroy or damage the fibres of the shell the collar 16 is not screwed directly onto the shell, but onto a hard wood collar 17 glued on to the shell root.

In the embodiment of Fig. 9, the shell root is filled with a filling 18 of solid compressed wood which is glued in place. The filling 18 may be placed in position during the assembling of the shells 2 and 3 comprising the blade. As with the arrangement of Fig. 8, a metal collar 16 is screwed onto the hard wood collar 17 glued on to the shell root.

Another alternative embodiment is illustrated in Fig. 10 in which the flanged metal sleeve 19, by which the blade is fixed to a hub, is secured in position within the root of the blade 1. In this case, the metal sleeve 19 is interlocked with the hard wood sleeve 20 (corresponding to the collar 17 in Figs. 8 and 9) glued inside the root, in order to avoid damage to the shell. The metal clamping rings 21 clamped around the root press and hold the parts firmly together.

The additional weight added by the filling does not materially add to the centrifugal forces arising in operation, which have to be kept as low as possible, since the filling is near the revolving axis.

For high-powered aircraft, airscrews of comparative lightness but great rigidity are required. The present invention enables this lightness to be achieved by the saving in weight due to the use of shells of comparatively thin section. The rigidity of the blade during operation can be increased by adding weight or using material of higher density at the blade tip. Figure 17 shows the blade tip 5 loaded by an insert 38 glued to the shell. The influence of centrifugal forces during operation will then considerably increase the stiffness and rigidity of the otherwise slightly elastic blade surface. For the same purpose, longitudinal ribs (wood or metal) may be glued, riveted or otherwise secured on the inside of the shell, as illustrated, for example, at 22 in Fig. 2.

In order to increase the durability and also to protect the surface of the blade, known methods of enveloping the blade in fabric or metal gauge with weatherproof protective lacquers or the like may be employed. Also, the leading edge of the blade may be protected in known manner. One method of protecting the blade is to sheath it partly or wholly with a thin skin of sheet metal, e. g., brass, duralumin or other light metal alloy. The metal sheathing may be incorporated during fabrication of the blade shells by placing it in the dies with the wood laminae, the sheet metal, with its uppermost surface roughened and provided with a suitable glue, being put in first with the laminae on top of it, in the manner described with reference to Figs. 3 and 4. This has the advantage that the sheet metal skin is shaped correctly and to closely fit the shell simultaneously with the formation thereof. Of course, the sheet metal may be applied subsequently.

When the sheet metal is applied during formation of the shells, there will be metal seams at the leading and trailing edges to be joined. Figs. 11 and 12 illustrate methods of joining the metal. In Fig. 11 the metal skins 23 and 24 covering the shells 1 and 2 respectively are joined by forming a bead 25. In Fig. 12 the metal skins 26 and 27 overlap and the overlapping edge 28 of the skin 26 is soldered to the skin 27. Alternatively, the overlapping parts of the two skins may be riveted to the shells 2, 3.

In order further to increase the resistance of the outer surface of the blade against denting by accidental impact, the blade shell may be filled with a mass of light synthetic material, such as that of the expanded rubber type made from rubber compounds expanded and vulcanized so as to yield a product which is hard but very light, like a porous brick.

It is desirable to relieve the shearing stresses on the glued seam between the shells 2 and 3, caused by the bending forces during flight and by vibration when in operation.

Figs. 13 and 14 illustrate two arrangements showing how the edges of the shells can be joined for this purpose. In Fig. 13, a wood insert 29 is glued to the inside of the blade along the leading edge. The insert 29 is placed in position before the shells 2 and 3 are united. This insert strengthens the joint and provides a greater area of contact thereat. In Fig. 14, similar inserts 30 and 31 are provided along both the leading and trailing edges of the blade respectively. In this arrangement, the insert 30 lies partly within and partly outside the shells 32 and 33 and actually forms the leading edge of the blade. The outer edge 37 of the insert 30 may consist of a different, preferably resilient edge protecting, material.

In an alternative, the shearing stresses on the glued seam may be diminished by strengthening the seam by keys, for example, in the manner illustrated in Figs. 15 and 16. In Fig. 15 the edges of the shells 2 and 3 which are to be joined together are provided with interlocking tongues and grooves (tenons and mortices) as illustrated at 34. The complementary interlocking elements may have any suitable form. With this arrangement, the edges of the shells are obviously not shaved as described earlier in this specification but are suitably worked to form the interlocking elements.

In the arrangement illustrated in Fig. 16, the edges of the shells 2 and 3 are shaved and the shells glued together, after which holes 35 are drilled along the joining line and dowel pins 36 are inserted therein.

Although the invention has been described with particular reference to the manufacture of airscrew blades, it is equally applicable to the manufacture of wooden structures for other parts of aircraft, for example, spars, cowlings and floats, and also for other purposes where the advantages of the invention are of importance.

I claim:

1. An airscrew blade comprising two separately formed half-shells of moulded and glued wood laminae, said shells being glued together along at least one of the leading and trailing edges of said blade, recesses formed in the meeting edges of said shells, and keying means engaging in said recesses and opposing destruction of the joint between said shells by shearing stress lengthwise of the blade.

2. As a new article of manufacture, a hollow structure comprising two separately formed half-shells of moulded and glued wood laminae, said shells being glued together along their edges, recesses formed in the meeting edges of said shells, and keying means engaging in said recesses and opposing destruction of the joint between said shells by shearing stress lengthwise of the structure.

3. An airscrew blade comprising two shells each formed of wood laminae glued together and bent to form the respective faces of the blade, said shells being united along a seam running longitudinally of the blade from the leading edge to the trailing edge thereof, and having a series of holes in the plane of said seam along said leading and trailing edges, and pins in said holes to key said shells together to combat shearing stress on said seam.

4. An airscrew blade comprising two separately formed half-shells of moulded and glued wood laminae, said shells being glued together along the leading and trailing edges of said blade, and having notched interlocking means located at the joint between said shells opposing destruction of said joint by shearing stress lengthwise of the blade.

5. An airscrew blade comprising two separately formed half-shells of moulded and glued wood laminae, said shells being glued together along the leading and trailing edges of said blade, the edges of said shells being formed with interlocking mortices and tenons providing a mortice joint.

6. An airscrew blade comprising two separately formed half-shells of moulded and glued laminae, the outermost lamina of each half-shell consisting of thin sheet metal and the remainder consisting of wood laminae, said shells being glued together along the leading and trailing edges of said blade, the edges of said shells being formed with interlocking mortices and tenons providing a mortice joint, and both said sheet metal laminae being rigidly joined together.

7. An airscrew blade comprising two separately formed half-shells of moulded and glued wood laminae, said shells being glued together along at least one of the leading and trailing edges of said blade, and having notched interlocking means located at the joint between the meeting edges of said shells and opposing destruction of said joint by shearing stress lengthwise of the blade.

8. An airscrew blade comprising two separately formed half-shells of moulded and glued wood laminae, said shells being glued together along at least one of the leading and trailing edges of said blade, and having a series of holes in the plane of the meeting edges of said shells, and dowels in said holes to key said shells together and oppose destruction of the joint between said shells by shearing stress lengthwise of the blade.

9. An airscrew blade as claimed in claim 1, in which said shells converge towards the leading edge of the blade with their front edges spaced apart, and an elongated member extending substantially throughout the length of the blade rabbeted to receive said front edges and lying partly within and partly outside said shells, the outside part of said member forming the leading edge of said blade.

10. Method of manufacturing an airscrew blade which consists in die-pressing and simultaneously gluing a plurality of thin wood laminae to produce a hollow shell forming one face of the blade, repeating the operation to produce a second shell forming the other face of the blade, joining the two shells together to form a hollow structure, and subsequently filling the hollow with a mass of cellular material lighter than that of the shell.

11. Method of manufacturing a structure which consists in die-pressing and simultaneously gluing a plurality of thin wood laminae of less than 1 mm. thickness to produce a hollow shell, repeating the operation to produce a second hollow shell, joining the two shells together to form a hollow structure, and subsequently filling the hollow with a mass of cellular material lighter than that of the shell.

12. A hollow airscrew blade comprising two separately die-pressed shells each comprising a plurality of wood laminae of less than 1 mm. thickness united by an adhesive, the fibres of the separate laminae all extending substantially parallel to the axis of the blade, and each shell being die-pressed to form one face of the blade, the pressure employed being of such high degree that the cells of the wood are substantially closed and the assembled laminae converted into a structure which is homogeneous throughout, said shells being joined together along the leading and trailing edges of said blade.

13. A hollow airscrew blade comprising two separately die-pressed shells each comprising a plurality of homogeneous wood laminae united by an adhesive, each shell being die-pressed to form one face of the blade with the outer lamina of each shell extending over the entire face of the shell, the pressure employed being of such high degree that the cells of the wood are substantially closed and the assembled laminae converted into a structure which is homogeneous throughout, said shells being joined together along the leading and trailing edges of said blade.

14. A hollow airscrew blade comprising two separately die-pressed shells each comprising a plurality of wood laminae of less than 1 mm. thickness united by an adhesive, the fibres of the separate laminae all extending substantially parallel to the axis of the blade and each shell being die-pressed to form one face of the blade with the outer lamina of each shell extending over the entire face of the shell, the pressure employed being of such high degree that the cells of the wood are substantially closed and the assembled laminae converted into a structure which is homogeneous throughout, said shells being joined together along the leading and trailing edges of said blade.

15. A hollow airscrew blade comprising two separately die-pressed shells each comprising a plurality of homogeneous wood laminae of less than 1 mm. thickness united by an adhesive, the fibres of the separate laminae all extending substantially parallel to the axis of the blade and each shell being die-pressed to form one face of the blade with the outer lamina of each shell extending over the entire face of the shell, said shells being glued together along the leading and trailing edges of said blade.

16. As a new article of manufacture, a hollow structure comprising two separately die-pressed shells each comprising a plurality of wood laminae of less than 1 mm. thickness united by an adhesive, the pressure employed being of such high degree that the cells of the wood are substantially closed and the assembled laminae converted into a structure which is homogeneous throughout, said shells being joined together along their edges.

17. A hollow airscrew blade comprising two separately die-pressed shells each comprising a plurality of wood laminae of less than 1 mm. thickness united by an adhesive, the fibres of the separate laminae all extending substantially parallel to the axis of the blade, each shell being die-pressed to form one face of the blade with the outer lamina of each shell extending over the entire face of the shell, the pressure employed being of such high degree that the cells of the wood are substantially closed and the assembled laminae converted into a structure which is homogeneous throughout and has a greater density at the root portion of the blade than at the tip of the blade, said shells being joined together along the leading and trailing edges of said blade.

18. An airscrew blade comprising two separately die-pressed shells of moulded laminae united by an adhesive, the outermost lamina of each shell consisting of thin sheet metal and extending over the entire face of the shell, and the remainder consisting of wood laminae of less than 1 mm. thickness and with their fibres all extending substantially parallel to the axis of the blade, each shell being die-pressed to form one face of the blade, the wood laminae of said shells being glued together along the leading and trailing edges of said blade, and the metal laminae being rigidly joined together.

19. As a new article of manufacture, a structure comprising two separately fabricated shells of moulded laminae united by an adhesive, the outermost lamina of each shell consisting of thin sheet metal and extending over the entire face of the shell, and the remainder consisting of wood laminae of less than 1 mm. thickness, the shell being die-pressed to shape, the pressure employed being of such high degree that the cells of the wood are substantially closed and the assembled laminae converted into a structure which is homogeneous throughout, the wood laminae of said shells being joined together, and the metal laminae being rigidly joined together.

20. An airscrew blade comprising two separately die-pressed shells of moulded laminae united by an adhesive, the outermost lamina of each shell consisting of thin sheet metal and extending over the entire face of the shell, and the remainder consisting of wood laminae, each shell being die-pressed to form one face of the blade, the wood laminae of said shells being glued together along the leading and trailing edges of said blade and the metal laminae being interlocked together to form a bead.

21. An airscrew blade comprising two separately die-pressed shells of moulded laminae united by an adhesive, the outermost lamina of each shell consisting of thin sheet metal and extending over the entire face of the shell, and the remainder consisting of wood laminae of less than 1 mm. thickness and with their fibres all extending substantially parallel to the axis of the blade, each shell being die-pressed to form one face of the blade, the wood laminae of said shells being glued together along the leading and trailing edges of said blade and the metal laminae being soldered together.

22. Method of manufacturing an airscrew blade comprising two separately formed shells of moulded and glued wood laminae, each shell providing one face of the blade, the method comprising the steps of arranging very thin wood laminae of larger size than the blade to be made and of less than 1 mm. thickness coated with heat-hardening adhesive between a matrix and a die profiled to conform with one face of the blade, and with the fibres of the individual laminae all extending substantially parallel to the axis of the blade, simultaneously heating said matrix and die and compressing and gluing said laminae together under pressure of such high degree that the cells of the wood are substantially closed and the assembled laminae are converted into a shell structure which is homogeneous throughout and has its outermost lamina extending over the entire face of the blade and conforming to the aerodynamic profile thereof, trimming-off the waste marginal portions to the outline of the die, repeating the operation to form the other shell, and joining the two shells together.

23. Method of manufacturing an airscrew blade comprising two separately formed shells of moulded and glued wood laminae, each shell providing one face of the blade, the method comprising the steps of coating very thin wood laminae of larger size than the blade to be made and of less than 1 mm. thickness with heat-hardening adhesive, arranging said laminae between a matrix and a die profiled to conform with one face of the blade, and with the fibres of the individual laminae all extending substantially parallel to the axis of the blade, simultaneously heating said matrix and die and compressing and gluing said laminae together under pressure of such high degree that the cells of the wood are substantially closed and the assembled laminae are converted into a shell structure which is homogeneous throughout and has its outermost lamina extending over the entire face of the blade and conforming to the aerodynamic profile thereof, trimming-off the waste marginal portions to the outline of the die, repeating the operation to form the other shell, and joining the two shells together.

24. Method of manufacturing an airscrew blade comprising two separately formed shells of moulded and glued wood laminae, each shell providing one face of the blade, the method comprising the steps of arranging very thin wood laminae of larger size than the blade to be made and of less than 1 mm. thickness with interleaved adhesive between a matrix and a die profiled to conform with one face of the blade, and with the fibres of the individual laminae all extending substantially parallel to the axis of the blade, simultaneously compressing and gluing said laminae together under pressure of such high degree that the cells of the wood are substantially closed and the assembled laminae are converted into a shell structure which is homogeneous throughout and has its outer surface conforming to the aerodynamic profile of one face of the blade, trimming-off the waste marginal portions to the outline of the die, repeating the operation to form the other shell, and joining the two shells together along the leading and trailing edges of the blade.

25. Method of manufacturing an airscrew blade comprising two separately formed shells of moulded and glued wood laminae, each shell providing one face of the blade, the method comprising the steps of arranging very thin wood laminae of larger size than the blade to be made and of less than 1 mm. thickness with interleaved adhesive between a matrix and a die profiled to conform with one face of the blade, simultaneously compressing and gluing said laminae together under pressure of such high degree that the cells of the wood are substantially closed and the assembled laminae are converted into a shell structure which is homogeneous throughout and has its outermost lamina extending over the entire face of the blade and conforming to the aerodynamic profile thereof, trimming-off the waste marginal portions to the outline of the die, repeating the operation to form the other shell, and joining the two shells together along the leading and trailing edges of the blade.

26. Method of manufacturing an airscrew blade comprising two separately formed shells of moulded and glued laminae, each shell providing one face of the blade, the method comprising the steps of arranging a thin outer metal lamina and a plurality of very thin wood laminae of larger size than the blade to be made with interleaved adhesive between a matrix and a die profiled to conform with one face of the blade, simultaneously compressing and gluing said laminae together under pressure of such high degree that the cells of the wood laminae are substantially closed and the assembled wood laminae are converted into a shell structure which is homogeneous throughout and has its outermost metal lamina extending over the entire face of the blade and conforming to the aerodynamic profile thereof, trimming-off the waste marginal portions of the wood laminae to the outline of the die, repeating the operation to form the other shell, and gluing the wood laminae of the two shells together along the leading and trailing edges of the blade, and joining the metal laminae together.

27. Method of manufacturing an airscrew blade comprising two separately formed shells of moulded and glued wood laminae, each shell providing one face of the blade, the method comprising the steps of arranging very thin wood laminae of larger size than the blade to be made with interleaved heat-hardening adhesive between a matrix and a die profiled to conform with one face of the blade, simultaneously heating said matrix and die and compressing and gluing said laminae together under pressure of such high degree that the cells of the wood are substantially closed and the assembled laminae are converted into a shell structure which is homogeneous throughout and has its outermost lamina extending over the entire face of the blade and conforming to the aerodynamic profile thereof, trimming-off the waste marginal portions to the outline of the die, repeating the operation to form the other shell, and joining the two shells together along the leading and trailing edges of the blade.

28. A hollow airscrew blade as claimed in claim 12 in which a metal hub sleeve is arranged at the root portion of the blade, means being provided for securing said metal sleeve to said root portion, said root portion being imperforate.

BRUNO JABLONSKY.